(12) United States Patent
Haramiishi et al.

(10) Patent No.: US 8,930,931 B2
(45) Date of Patent: Jan. 6, 2015

(54) INFORMATION PROCESSING APPARATUS USING UPDATED FIRMWARE AND SYSTEM SETTING METHOD

(75) Inventors: Hiroaki Haramiishi, Hadano (JP); Yukiharu Yoshimura, Kamakura (JP); Takayuki Abe, Hadano (JP)

(73) Assignee: Hitachi, Ltd., Tokyo (JP)

( * ) Notice: Subject to any disclaimer, the term of this patent is extended or adjusted under 35 U.S.C. 154(b) by 721 days.

(21) Appl. No.: 12/908,997

(22) Filed: Oct. 21, 2010

(65) Prior Publication Data

US 2011/0099544 A1    Apr. 28, 2011

(30) Foreign Application Priority Data

Oct. 22, 2009  (JP) ................................. 2009-243131

(51) Int. Cl.
*G06F 9/44* (2006.01)
*G06F 9/445* (2006.01)

(52) U.S. Cl.
CPC ..................................... *G06F 8/665* (2013.01)
USPC .......................................... 717/168; 717/170

(58) Field of Classification Search
USPC ................................................ 717/168, 170
See application file for complete search history.

(56) References Cited

U.S. PATENT DOCUMENTS

| | | | |
|---|---|---|---|
| 5,699,275 A | * | 12/1997 | Beasley et al. ................ 709/221 |
| 2006/0259207 A1 | * | 11/2006 | Natsume ........................... 701/1 |
| 2007/0067763 A1 | * | 3/2007 | Sonbarse et al. .............. 717/168 |
| 2008/0109798 A1 | * | 5/2008 | Gavens et al. ................ 717/168 |

FOREIGN PATENT DOCUMENTS

| | | |
|---|---|---|
| JP | 10-214183 | 8/1998 |
| JP | 11-007382 | 1/1999 |
| JP | 2003-280937 | 10/2003 |

* cited by examiner

*Primary Examiner* — Li B Zhen
*Assistant Examiner* — Hang Pan
(74) *Attorney, Agent, or Firm* — Brundidge & Stanger, P.C.

(57) ABSTRACT

In an information processing apparatus, a first processor executes firmware and data processing instructions, a second processor conducts management of firmware updating and system settings, first and second memories store current and updated firmware, a third memory stores system settings information, and a switch changes connections of the first and second memories under control of the second processor, to connect one of the first and second memories to a bus connected to the first processor and to connect the other to the second processor. During firmware execution by the first processor, the second processor reads the system settings information from the third memory and provides it to the first processor. The first processor reflects firmware data from updated firmware in the second memory in the system settings information and the second processor stores the system settings information in which updated firmware data is reflected into the third memory.

8 Claims, 9 Drawing Sheets

| ORIGIN OF CONNECTION | CURRENT DESTINATION OF CONNECTION | SUBSEQUENT DESTINATION OF CONNECTION |
|---|---|---|
| BUS 107 | FLASH ROM 131 | FLASH ROM 132 |
| CROSSBAR SWITCH BUS 12 | FLASH ROM 132 | FLASH ROM 131 |

FIG. 6

| DESTINATION OF CONNECTION | FIRMWARE VERSION | STATE | SETTINGS RESTORATION |
|---|---|---|---|
| FLASH ROM 131 | 01-00 | NORMAL | NOT REQUIRED |
| FLASH ROM 132 | 01-01 | NORMAL | REQUIRED |

FIG. 7

| RECORD NO. | OFFSET | DATA LENGTH | VERSION | SETTING ITEM NAME | SETTING VALUE |
|---|---|---|---|---|---|
| 1 | 0 | 1 | 01-00 | Boot Priority 1 | HardDisk |
| 2 | 1 | 1 | 01-00 | Boot Priority 2 | CD-ROM |
| 3 | 2 | 2 | 01-00 | Boot Priority 3 | Network |
| 4 | 4 | 4 | 01-00 | Memory Operating Mode | Mirroring |
| 5 | 8 | 1 | 01-00 | Patrol Scrub | Enable |
| 6 | 9 | 1 | 01-00 | Memory Test | Enable |
| 7 | 10 | 1 | 01-00 | Memory Interleave | Enable |
| 8 | 11 | 2 | 01-01 | Wake On LAN | Disable |
| 9 | 13 | 2 | 01-01 | Console Redirection | Enable |
| 10 | 13 | 2 | 01-02 | Launch Option ROM | Enable |

INFORMATION PROCESSING APPARATUS USING UPDATED FIRMWARE AND SYSTEM SETTING METHOD

CLAIM OF PRIORITY

The present application claims priority from Japanese application JP 2009-243131 filed on Oct. 22, 2009, the content of which is hereby incorporated by reference into this application.

BACKGROUND OF THE INVENTION

Field of the Invention

The present invention relates to an information processing apparatus and a system setting method and, in particular, relates to system setting in conjunction with updating firmware of the information processing apparatus.

In computer systems, firmware is used for initialization, condition check, and input/output control of an information processing device, when powering on the device and resetting it. Firmware is generally provided in a nonvolatile memory that is electrically rewritable and thus may be modified in order to reconfigure or troubleshoot the device as well as to troubleshoot or upgrade the firmware itself. In order to update the firmware, the user is technically able to modify the firmware by obtaining firmware data and a firmware updating tool from a vendor providing them.

However, it may fail to update firmware because of human-induced causes such as lack of sufficient information and a procedural error. It also may fail to update firmware because, during update, the power supply for information processing is stopped due to power interruption occurring or by activation of a power production circuit of the information processing device, because of a fault occurring in the nonvolatile memory, or for other reasons. In case the device is powered on or reset in a state of firmware update failure, there is a possibility that the information processing device fails to boot up.

A firmware updating tool typically runs on an operating system and rewrites the contents of a nonvolatile memory that is used by the information processing device. Consequently, in case of firmware update failure, the device will not boot up. If the device has become unable to boot up, there is no means for recovering the firmware written in the nonvolatile memory and, therefore, the information processing device needs to be replaced.

Japanese Published Unexamined Patent Application No. Hei 10-214183 (1998) discloses a BIOS updating system that makes it possible to rewrite BIOS, that is, firmware information without user intervention and provides a simple recovery method by which recovery is facilitated in case of failure. According to this technique, firmware recovery can be made by performing specific operation in a section preceding the information processing device without replacing the information processing device.

Japanese Published Unexamined Patent Application No. 2003-280937 discloses a firmware download system including a first firmware memory for storing firmware currently in use, a second firmware memory for storing an update version of firmware, and error detection means for detecting an error in the update version of firmware. In case a fault should occur during the download of an update version of firmware, it triggers switching to the first firmware memory to ensure that the firmware currently in use before update still continues to be used. In this way, redundancy and reliability are improved.

SUMMARY OF THE INVENTION

In the firmware download system disclosed in Japanese Published Unexamined Patent Application No. 2003-280937, a main control unit A1 of equipment, which can be considered as a main processor of the system, implements control of firmware downloading. Therefore, the main control unit A1 of the equipment is burdened with a large load for processing both system data processing and firmware downloading control. In Japanese Published Unexamined Patent Application No. 2003-280937, there is no description as to how system setting is performed in conjunction with firmware updating and management of system settings information.

The present invention lies in automatically carrying out system setting in conjunction with firmware updating and easily reflecting system settings information in updated firmware.

An information processing apparatus pertaining to the present invention is preferably configured as an information processing apparatus capable of updating system settings information by executing firmware, the information processing apparatus including a first processor to execute firmware and instructions for data processing, a second processor to conduct management of at least firmware updating and system settings, a first memory and a second memory capable of storing current firmware and updated firmware, a third memory to store the system settings information, and a switch to change connections of the first memory and the second memory under control of the second processor, to connect one of the first and second memories to a bus connected to the first processor and to connect the other one of the first and second memories to the second processor, wherein the second processor stores firmware for update into the second memory through control of the switch;

after the updated firmware is stored in the second memory, the second processor connects the second memory to the bus through control of the switch;

the first processor executes the updated firmware obtained from the second memory via the bus;

during the execution of the firmware by the first processor, the second processor reads the system settings information from the third memory and provides this information to the first processor;

the first processor reflects firmware data from the updated firmware stored in the second memory in the system settings information; and the second processor stores the system settings information in which updated firmware data is reflected into the third memory.

In a preferable example, the second processor is commanded to update the firmware in accordance with a command from an external terminal via a network and executes firmware update processing in response to this command.

Also preferably, the first processor executes initialization processing based on the system settings information in which updated firmware data is reflected and, if no error is detected after the initialization processing, the second processor stores the system settings information in which updated firmware data is reflected into the third memory.

Also preferably, the third memory stores switch settings information specifying the first or second memory as current and subsequent destinations of connections of the bus and the switch and the second processor refers to the switch settings information read from the third memory and controls the switch to update the subsequent destination of connection of the switch and change the connection of the first or second memory to the bus.

Also preferably, the third memory stores firmware management information indicating firmware versions existing in the first and second memories, their states, and whether or not settings restoration is required, the second processor reads the firmware management information from the third memory, and, if the firmware management information indicates that system settings information should be restored, the first processor reflects firmware data from the updated firmware in the system settings information.

A setting method pertaining to the present invention is preferably configured as a system setting method for use in an information processing apparatus capable of updating system settings information by executing firmware and including a first processor to execute firmware and instructions for data processing, a second processor to conduct management of at least firmware updating and system settings, a first memory and a second memory capable of storing current firmware and updated firmware, a third memory to store the system settings information, and a switch to change connections of the first memory and the second memory under control of the second processor, to connect one of the first and second memories to a bus connected to the first processor and to connect the other one of the first and second memories to the second processor, the system setting method including:

a step in which the second processor stores firmware for update into the second memory through control of the switch;

a step in which, after the updated firmware is stored in the second memory, the second processor connects the second memory to the bus through control of the switch;

a step in which the first processor executes the updated firmware obtained from the second memory via the bus;

a step in which, during the execution of the firmware by the first processor, the second processor reads the system settings information from the third memory and provides this information to the first processor;

a step in which the first processor reflects firmware data from the updated firmware stored in the second memory in the system settings information; and a step in which the second processor stores the system settings information in which updated firmware data is reflected into the third memory.

According to the present invention, it becomes possible to automatically carry out system setting in conjunction with firmware updating and easily reflect system settings information in updated firmware through the use of a management processor without being influenced by the operation of a processor for processing instructions.

DETAILED DESCRIPTION OF PREFERRED EMBODIMENT

Figure 1:
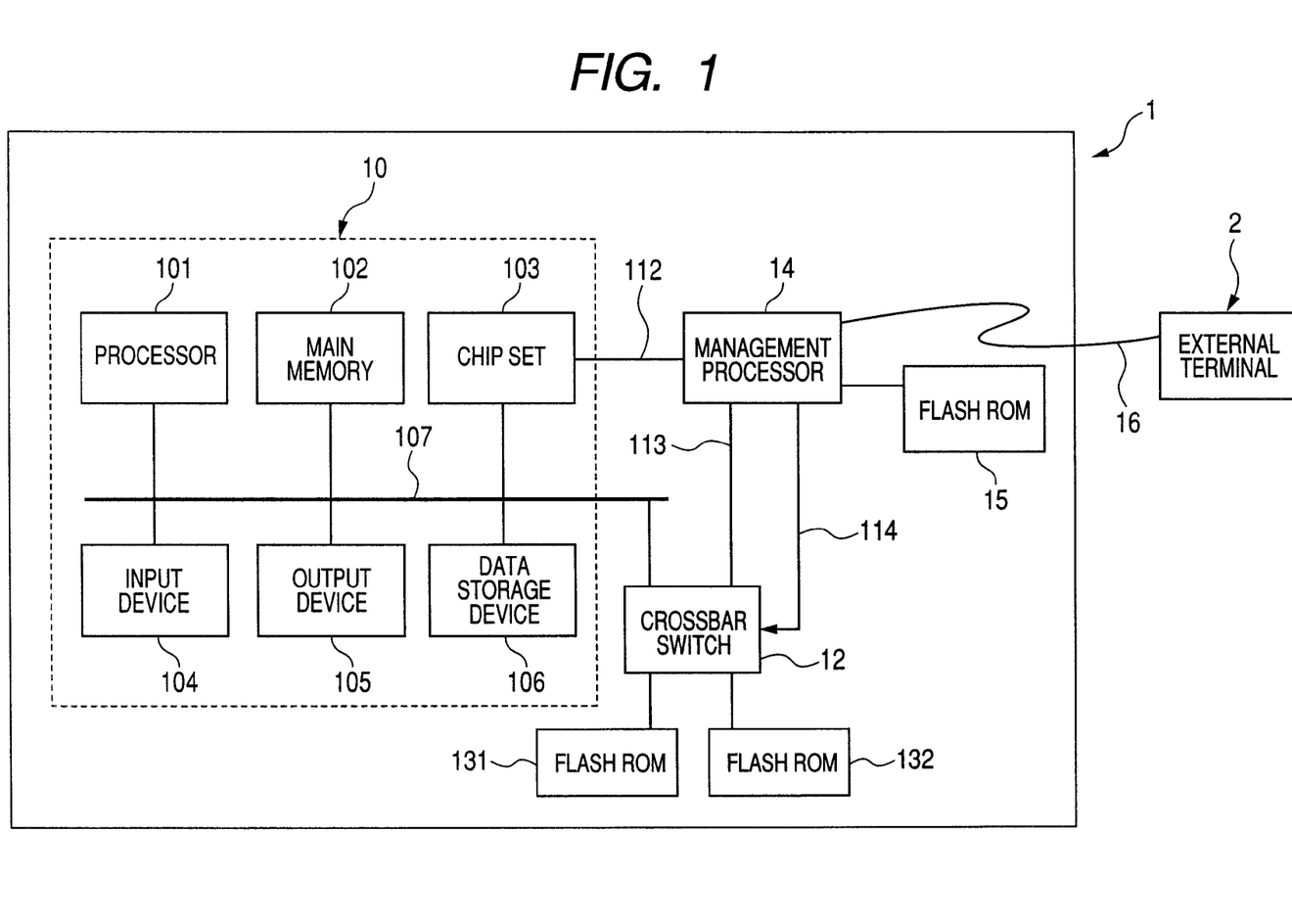
FIG. 1 is a block diagram showing a structure of an information processing apparatus in an exemplary embodiment.

In the following, an exemplary embodiment of the present invention will be described with reference to the drawings. FIG. 1 shows a structure of the information processing apparatus. The information processing apparatus is, for example, a server apparatus 1 and is divided into a data processing section 10 and other sections (including, e.g., a management section responsible for managing the system environment involving program updating, supervision of the server apparatus, and other functions). The data processing section 10 includes a processor 101 which executes firmware and instructions for data processing, a main memory 102 of the system in which instructions and data are stored, a chip set 103 which conducts management of input and output to/from the server apparatus, an input device 104, an output device 105, a data storage device 106, and a bus 107 interconnecting these components. This section provides the system environment for operation on a given OS (operating system).

Flash ROMs 131 and 132 as nonvolatile memories for storing firmware are connected to the bus 107 via a crossbar switch 12. Further, the crossbar switch 12 is connected to the management processor 14 via a crossbar switch data bus 113 and a crossbar switch control bus 114. The management processor 14 is connected to the chip set 103 via a management bus 112.

The management processor 14 conducts management of the system operating environment such as managing the server power supply. This processor is configured by using, for example, a built-in microcomputer and runs on another OS different from the above-mentioned given OS on which the processor 101 runs. The management processor 14 has a flash ROM 15 as a nonvolatile memory for storing system settings information. The management processor 14 is connected to an external terminal 2 such as, for example, a personal computer, via a network 16. The flash ROMs 131, 132 are nonvolatile memories which are electrically erasable and writable according to a program. In these flash ROMs, data for firmware or updated firmware (system firmware for the data processing section 10 in the server apparatus) is stored. The management processor 14, crossbar switch 12, and flash ROMs 15, 131, 132 operate with a standby power supply of the server apparatus 1 and are able to operate without being influenced by the state of a main power supply.

Figure 4:
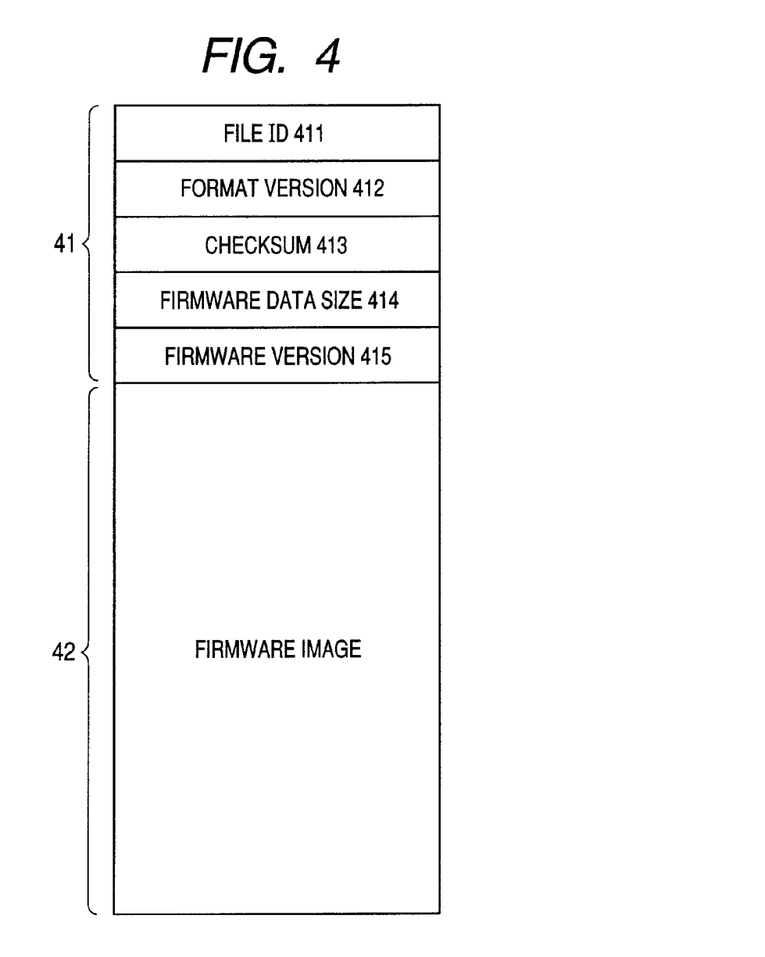
FIG. 4 illustrates a firmware data structure in an exemplary embodiment.
Figure 6:
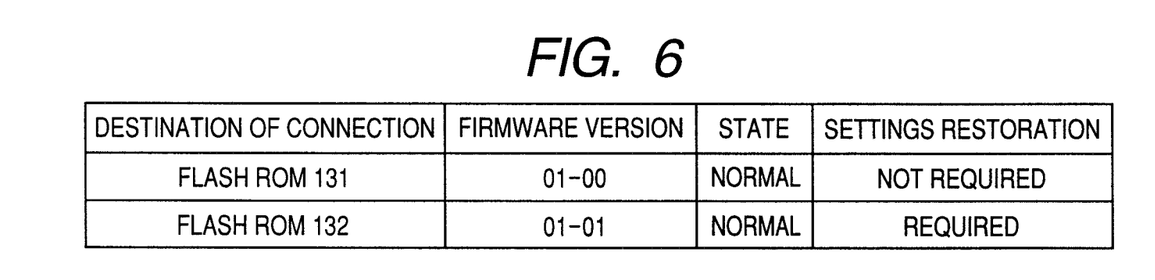
FIG. 6 illustrates a structure of firmware management information in an exemplary embodiment.
Figure 7:
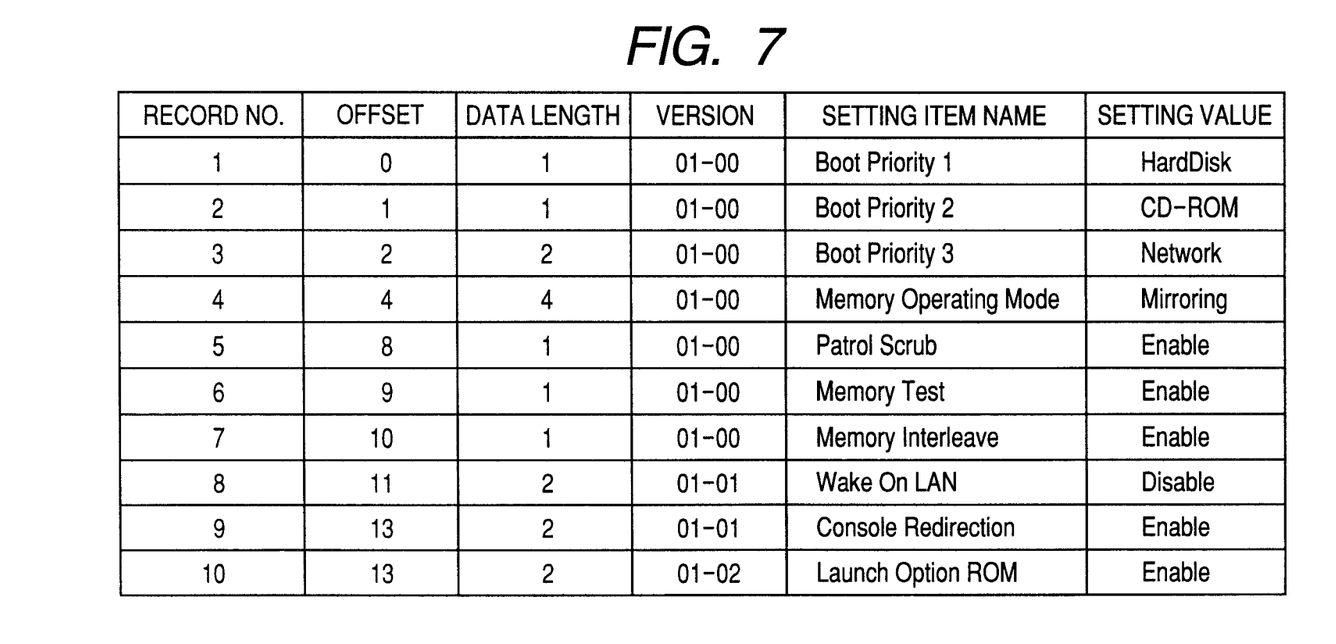
FIG. 7 illustrates a structure of system settings information in an exemplary embodiment.

Firmware data includes a header 41 and a firmware image 42, as shown in FIG. 4. The header 41 includes a file ID 411, format version 412, checksum 413, firmware data size (file size) 414, and firmware version 415. The flash ROM 15 is electrically erasable and writable according to a program executed by the management processor 14 and stores crossbar switch settings information (FIG. 5), firmware management information (FIG. 6), and system settings information (FIG. 7).

Figure 5:
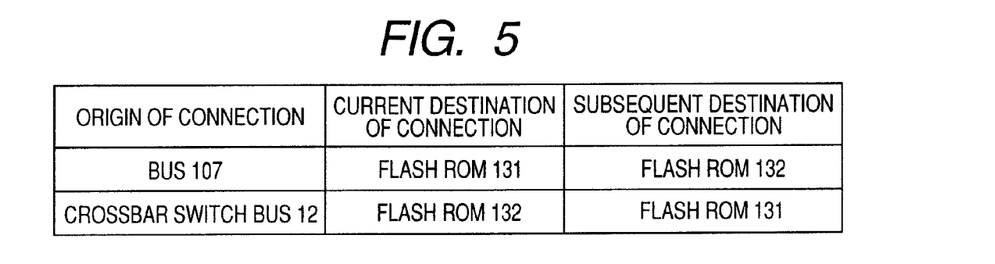
FIG. 5 illustrates a structure of crossbar switch settings information in an exemplary embodiment.

As shown in FIG. 5, the crossbar switch settings information includes information indicating flash ROMs which are fixed as current and subsequent destinations of connections of the bus 107 and the crossbar switch 12. As shown in FIG. 6, the firmware management information includes information indicating firmware versions existing in the flash ROMs 131, 132, their states, and whether or not settings restoration is required. The system settings information defines information for use in conjunction with firmware and its modification and is user-configurable information. As shown in FIG. 7, the system settings information includes information relating to record number, offset, data length, firmware version, setting item name, setting value.

Figure 2:
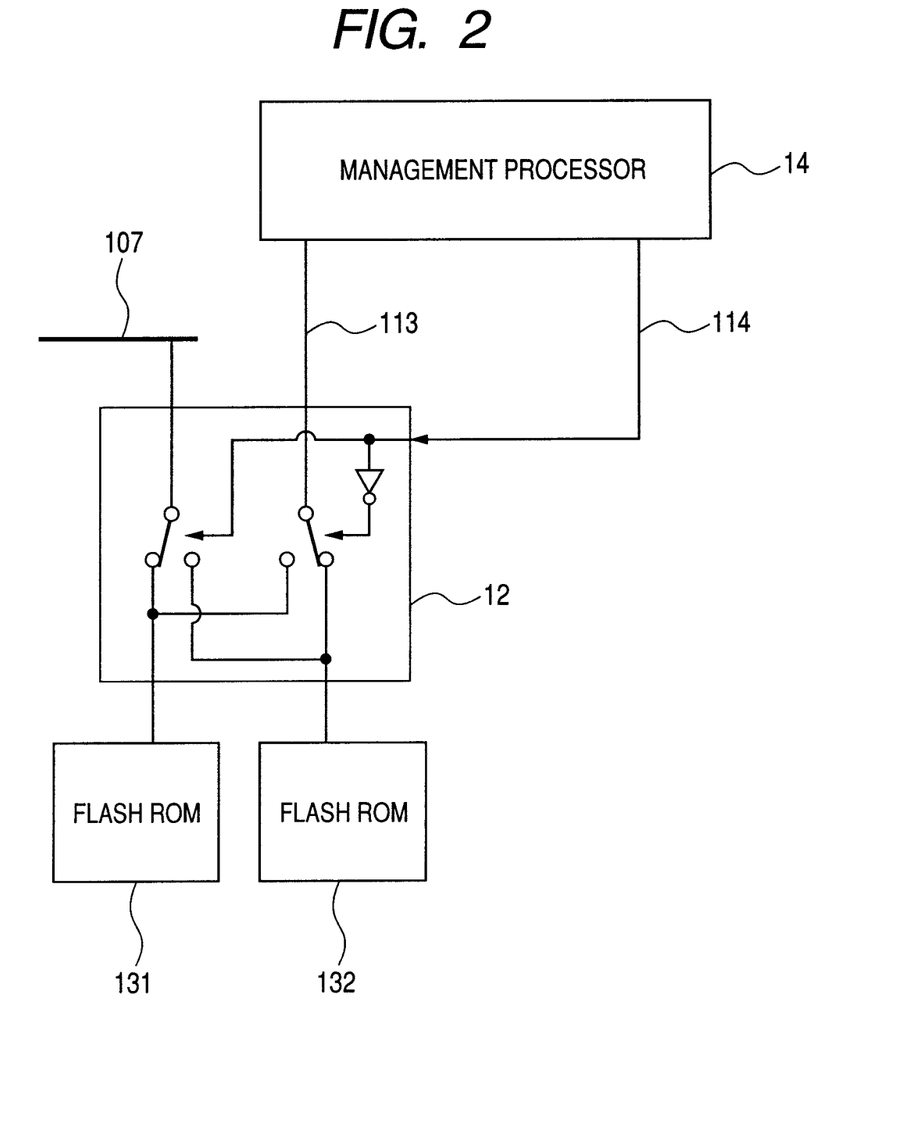
FIG. 2 is a block diagram showing an internal structure of a crossbar switch in an exemplary embodiment.
Figure 3:
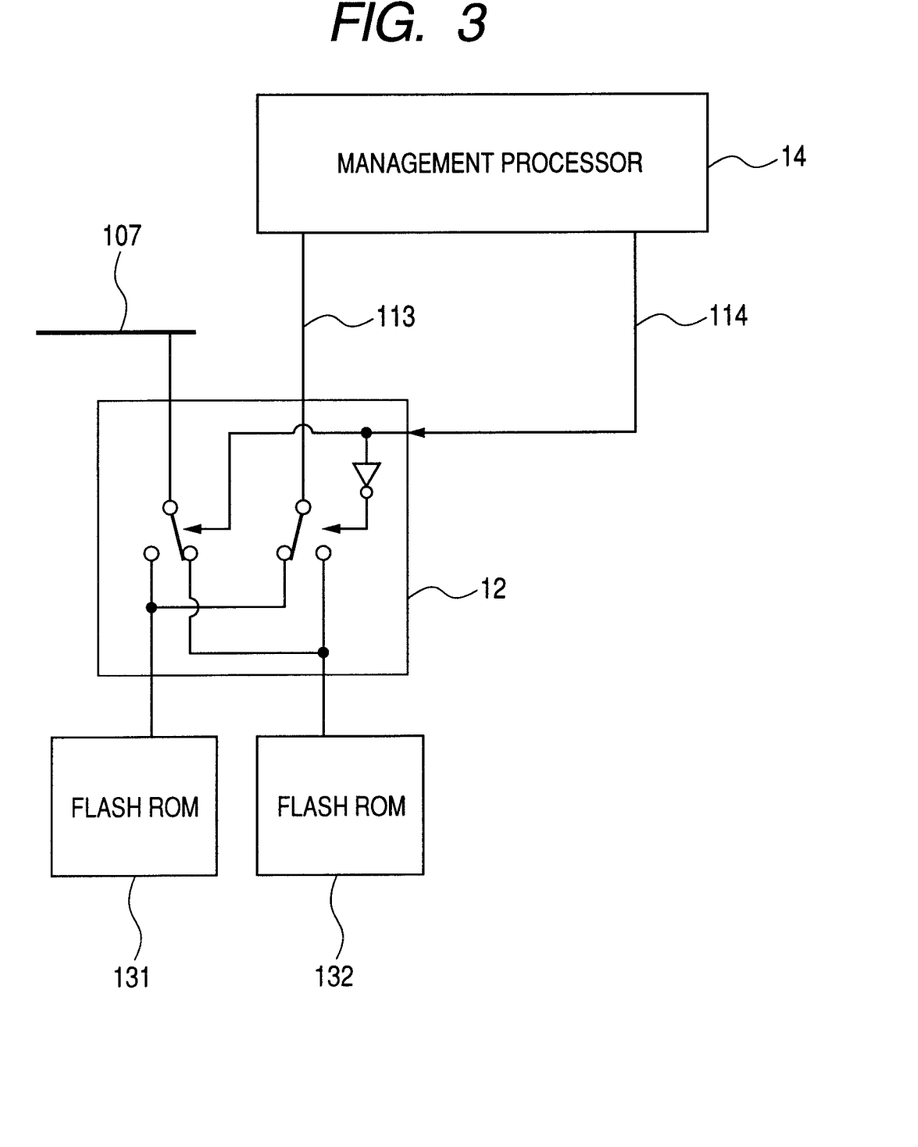
FIG. 3 is a block diagram showing the internal structure of the crossbar switch in an exemplary embodiment.

FIGS. 2 and 3 show an internal structure of the crossbar switch 12. Inside the crossbar switch 12, a bus switch is provided. When the crossbar switch 12 receives a signal with "L" level transmitted through the crossbar switch control bus 114 from the management processor 14, it connects the bus 107 to the flash ROM 131 and connects the crossbar switch bus 113 to the flash ROM 132, as shown in FIG. 2. When the crossbar switch 12 receives a signal with "H" level transmitted through the crossbar switch control bus 114 from the management processor 14, it connects the bus 107 to the flash ROM 132 and connects the crossbar switch bus 113 to the flash ROM 131.

Accordingly, it is possible to physically separate a flash ROM (either 131 or 132) which is used to boot the server apparatus 1 and a flash ROM (either 131 or 132) which is used to update the firmware under control of the management processor. Hence, even in the event of firmware update failure, it does not involve the flash ROM that is used to boot the server apparatus 1. So, firmware updating can be performed safely.

Figure 8:
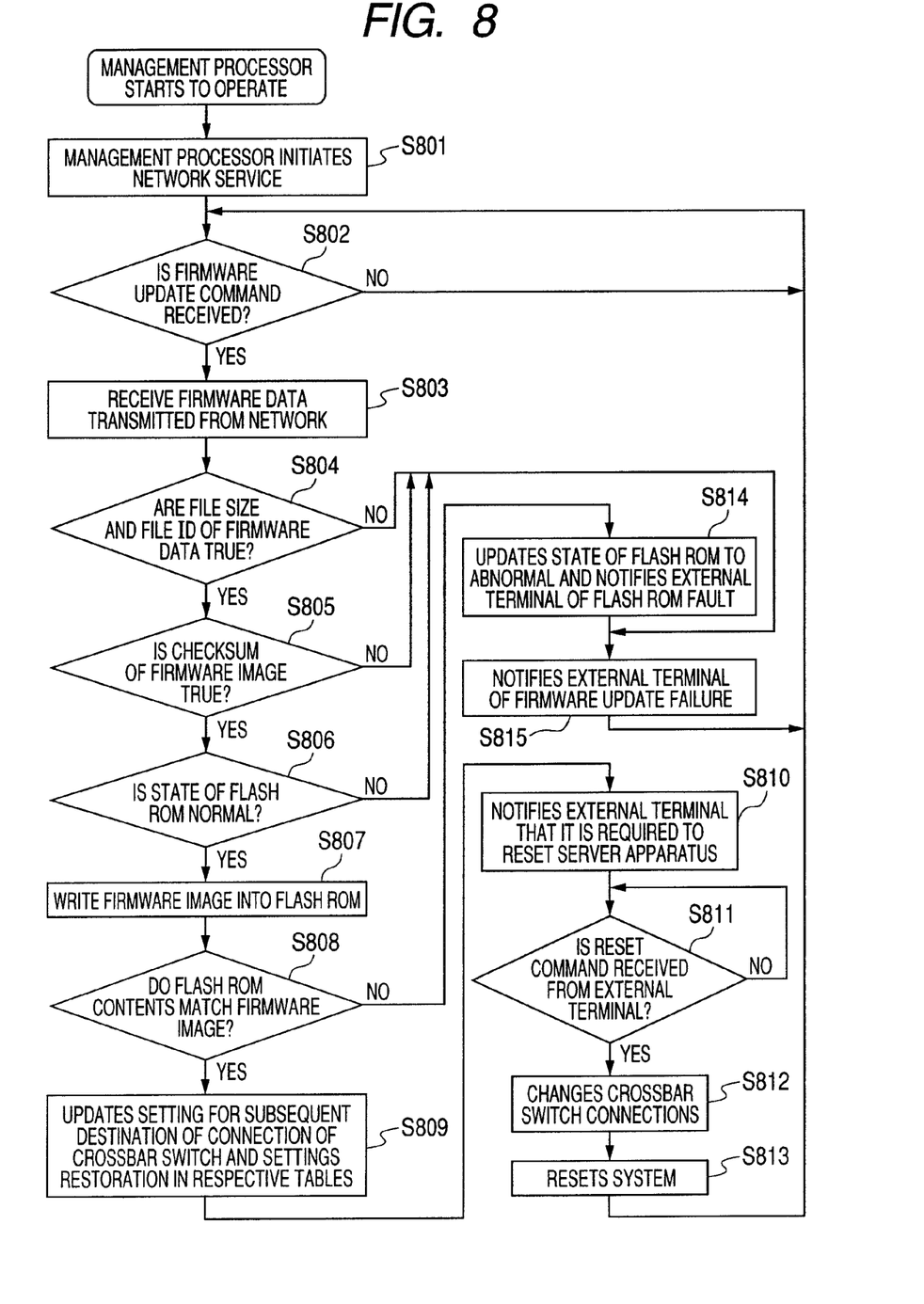
FIG. 8 is a flowchart describing firmware update processing operation in an exemplary embodiment.

Then, firmware update processing operation is described with reference to FIG. 8. It is now assumed that the crossbar switch 12 is controlled by the management processor 14 and placed in a state that it makes the connections as shown in FIG. 2. The management processor 14 of the server apparatus 1 initiates a network service (for example, Web server) and prepares for an firmware update operation in response to a user action from the external terminal 2 via the network 16 (step S801). After initiating the network service, the management processor 14 waits for a firmware update command received from the external terminal 2 (for example, access from a Web browser of the personal computer to a Web browser of the management processor 14) (step S802).

When a firmware update command is received from the external terminal 2 (step S802), the server (management processor 14) receives firmware data (FIG. 4) transmitted from the external terminal 2 via the network 16 (step S803). The management processor 14 checks the firmware data size 414 and the file ID 411 of the received firmware data and makes sure that the received data is data for updating the firmware (step S804). It also calculates a checksum of a firmware image 42 included in the firmware data and verifies whether the calculated checksum matches the checksum 413 specified in the header 41 (step S805). As a result of the verification, if the checksum of the firmware image is correct, the management processor 14 writes the firmware image 42 into the flash ROM 132 via the crossbar switch bus 113 (step S807). Otherwise, if the file ID of the received data is incorrect, or if the checksum is incorrect, the management processor regards the update as failed. Then, the management processor 14 transmits an update failure message to the external terminal 2 via the network 16, so that an error message is displayed on the external terminal (step S815). Thus, the user can know the update failure.

After writing the firmware image 42 into the flash ROM 132, the management processor 14 reads the contents of the flash ROM 132 via the crossbar switch bus 113 and verifies whether the read contents of the flash ROM matches the firmware image (step S808). As a result of the verification, if the contents of the flash ROM 132 matches the firmware image, the management processor 14 rewrites the firmware version associated with the flash ROM 132 connected to the crossbar switch bus in the firmware management information table (FIG. 6) to the version 415 specified in the header 41 of the firmware data. In addition, it sets a value "required" for the flash ROM 132 in the settings restoration column in the firmware management information table. Then, it stores the firmware management information into the flash ROM 15. As for the crossbar switch settings information (FIG. 5), it updates the subsequent destination of connection of the bus 107 to the flash ROM 132 and updates the subsequent destination of connection of the crossbar switch bus 113 to the flash ROM 131. Then, it stores the updated crossbar switch settings information into the flash ROM 15 (step S809).

The management processor 14 notifies the user of successful firmware update and notifies the external terminal 2 that a reboot is required to activate the updated firmware (step S810). Then, the management processor 14 waits for a reset command received from the external terminal 2 (step S811). Upon receiving a reset command from the external terminal 2, the management processor 14 controls the crossbar switch control bus 114, according to the settings of subsequent destinations of connections in the crossbar switch settings information (FIG. 5) stored in the flash ROM 15. That is, according to the settings of the destinations of bus connections, the crossbar switch connects the bus 107 to the flash ROM 132 and connects the crossbar switch bus 113 to the flash ROM 131, as shown in FIG. 3. Then, the management processor copies the settings of subsequent destinations of connections in the crossbar switch settings information to the fields of current destinations of connections and stores the updated information into the flash ROM 15 (step S812).

After the crossbar switch 12 is set accordingly, the management processor 14 transmits a reset signal to the chip set 103 to reboot the server apparatus 1, thus booting or rebooting the server apparatus 1 (step S813). By this operation, the crossbar switch 12 is placed in the state as shown in FIG. 3 and the server apparatus 1 activates the system based on the updated firmware stored in the flash ROM 132 connected via the crossbar switch 12.

If the contents of the flash ROM 132 do not match the firmware image (step S808), the management processor reads the firmware management information (FIG. 6) and updates the state of the flash ROM 132 to "abnormal". Then, it sends an error message to be displayed on the external terminal 2 via the network 16 in order to notify the user that a fault has occurred in the flash ROM 132 (step S814). In addition, it sends an error message to be displayed on the external terminal 2 in order to notify the user of update failure (step S815). In this case, the firmware update is aborted due to the fault of the flash ROM 132.

Figure 9A:
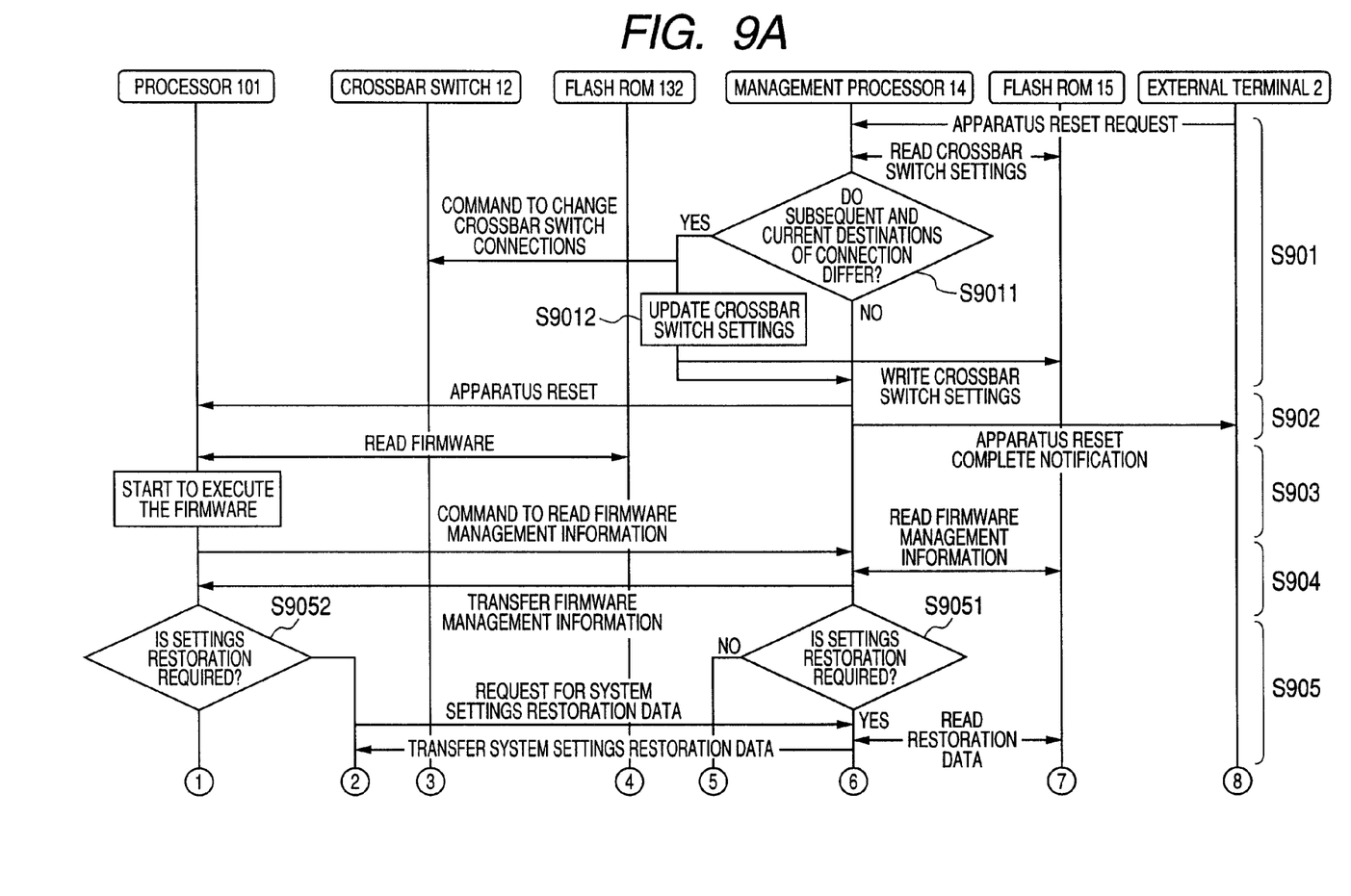
FIG. 9A is a flowchart describing system settings restoration processing operation in an exemplary embodiment.

Then, a processing flow of system settings restoration processing in the present embodiment is described with reference to FIGS. 9A and 9B. It is now assumed that the crossbar switch 12 is placed in the state as shown in FIG. 2 and respective information sets shown in FIGS. 5 to 7 are stored in the flash ROM 15. The updated firmware is stored in the ROM 132. When an apparatus reset request is issued from the external terminal 2 to the management processor 14, the management processor 14 reads the crossbar switch settings from the flash ROM 15 and checks whether subsequent and current destinations of connections differ (S9011). As a result of the check, if the subsequent and current destinations of connections differ, the settings of the crossbar switch 12 are updated (S9012) and the crossbar switch 12 is made to change the connections of flash ROM 131 and flash ROM 132, that is, the crossbar switch 12 is placed in a state that it makes the connections as shown in FIG. 3. Then, the management processor updates the subsequent and current destinations of connections in the crossbar switch settings and writes these settings into the flash ROM 15 (step S901). After that, the management processor 14 issues a reset command to the processor 101 and notifies the external terminal 2 of reset completion (step S902).

After the server apparatus 1 is reset, the processor 101 of the server apparatus 1 reads the firmware from the flash ROM 132 connected to the bus 107 via the crossbar switch 12 and starts to execute the firmware in the processor 101 (step S903). The firmware being executed by the processor 101 issues a command to read firmware management information to the management processor 14 via the management bus 112. The management processor 14 having received the request reads firmware management information as shown in FIG. 6 from the flash ROM 15 and transfers the firmware management information relating to the flash ROM 132 connected to the bus 107 to the firmware being executed by the processor 101 (step S904).

At this time, the management processor 14 determines whether settings restoration is required (S9051) by referring to the settings restoration column in the firmware management information table obtained in step S904. Likewise, the firmware being executed by the processor 101 determines whether settings restoration is required (S9052) by referring to the settings restoration column in the firmware management information table obtained in step S904. As a result, if settings restoration is required, the firmware issues a request for system settings restoration data to the management processor 14 via the management bus 112. Upon receiving the request for system settings restoration data, the management processor 14 reads system settings information (which may also be referred to as system settings restoration data hereinafter) as shown in FIG. 7 from the flash ROM 15 and transfers the system settings restoration data to the firmware being executed by the processor 101 (step S905).

Now, the reason why system settings information may be referred to as system settings restoration data is explained below. System settings information stored in the flash ROM 15 contains all relevant versions of firmware, whereas firmware data stored in the flash ROM 132 (or 131) covers only a version to be updated. When the version to be updated is incorporated into the system settings information as shown in FIG. 7 and updated, conversion between both data formats takes place, which is referred to conversion to/from system settings information. Data to be converted to/from system settings information is referred to system settings restoration data. For example, a firmware version 01-00 that includes data corresponding to seven entries of record numbers #1 to #7 is stored in the flash ROM 132. Only the entries of record numbers #1 to #7 out of the system settings information stored in the flash ROM 15 are restored and updated. This presumes that the data formats of the flash ROM 132 (or 131) and the flash ROM 15 differ from each other. If both the data formats are the same, no conversion processing will be needed.

Figure 9B:
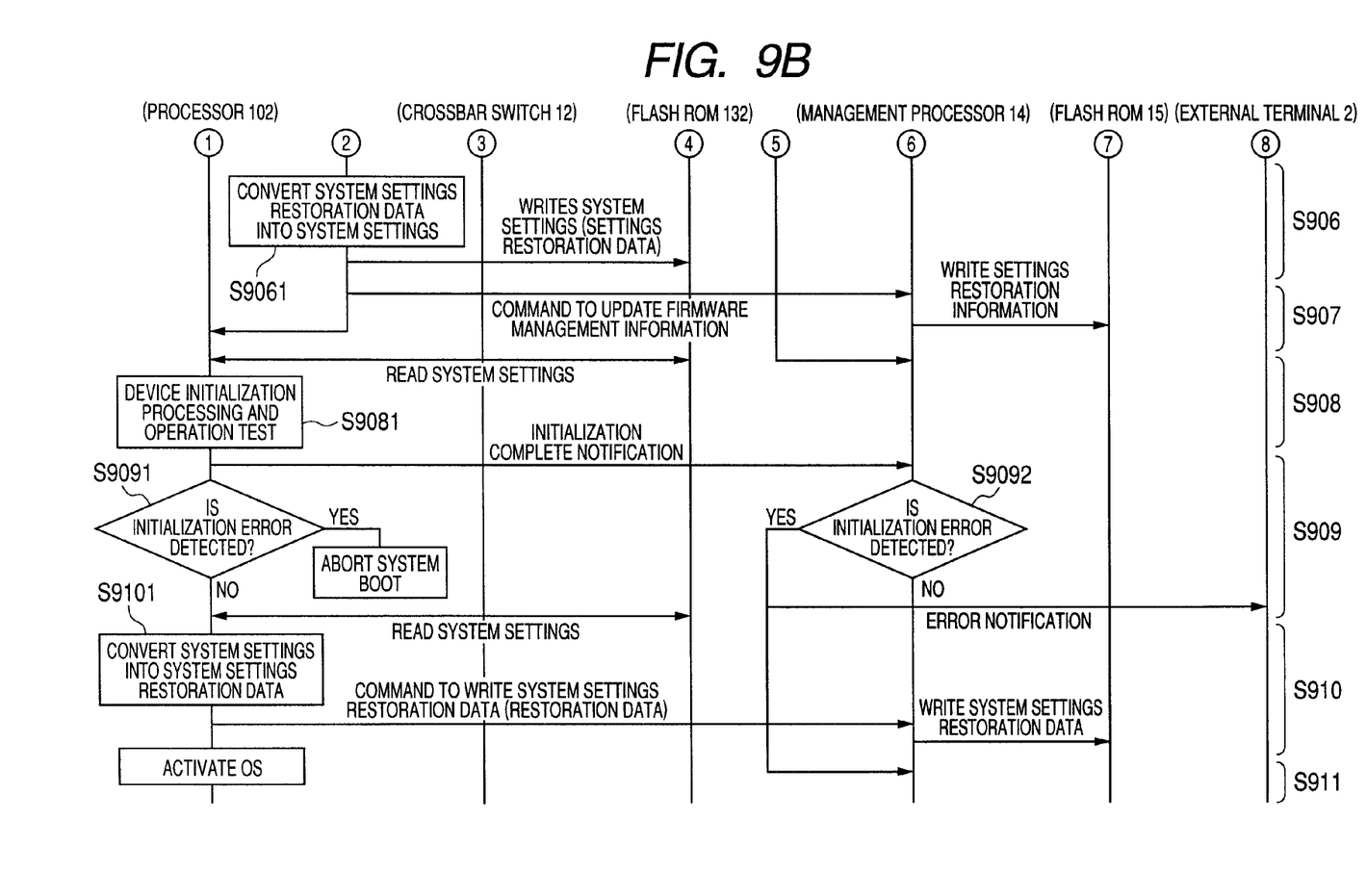
FIG. 9B is a flowchart describing the system settings restoration processing operation in an exemplary embodiment.

Then, referring to FIG. 9B, the firmware being executed by the processor 101 converts the received system settings restoration data into system settings information (S9061) and writes the latter into the flash ROM 132 (step S906).

After writing the system settings restoration data into the flash ROM 132, the firmware being executed by the processor 101 issues a command to update firmware management information to the management processor 14 via the management bus 112. The management processor 14 updates the settings restoration column for the flash ROM 132 to "not required" in the firmware management information table as shown in FIG. 6 and writes this information into the flash ROM 15 (step S907).

The firmware being executed by the processor 101 reads the system settings from the flash ROM 132 and executes device initialization processing and an operation test of the server apparatus 1, based on the system settings (step S9081). At the completion of step S908, the firmware being executed by the processor 101 issues an initialization complete notification including initialization error information to the management processor 14 via the management bus 112. If a device initialization error is detected (S9091) during the initialization and test, the firmware aborts the system boot of the server apparatus 1. If the management processor 14 detects a device initialization error in the initialization complete notification (S9092), it notifies the external terminal 2 of an error detected in the server apparatus (step S909).

If the device initialization processing has been completed normally in all respects, the firmware being executed by the processor 101 reads the system settings from the flash ROM 132 and converts it into the format of the system settings restoration data as shown in FIG. 7 (S9101). Then, the firmware issues a command to write the system settings restoration data to the management processor 14 via the management bus 112 and transfers the converted system settings restoration data. The management processor writes the received system settings restoration data into the flash ROM 15 (step S910).

The firmware being executed by the processor 101 activates the OS for the data processing section 10 through control of the data storage device 106 (step S911). By the foregoing processing, it is possible to make the system settings of the updated firmware the same as those of the firmware before the firmware update. The system settings in conjunction with the firmware update can be done automatically.

Figure 10:
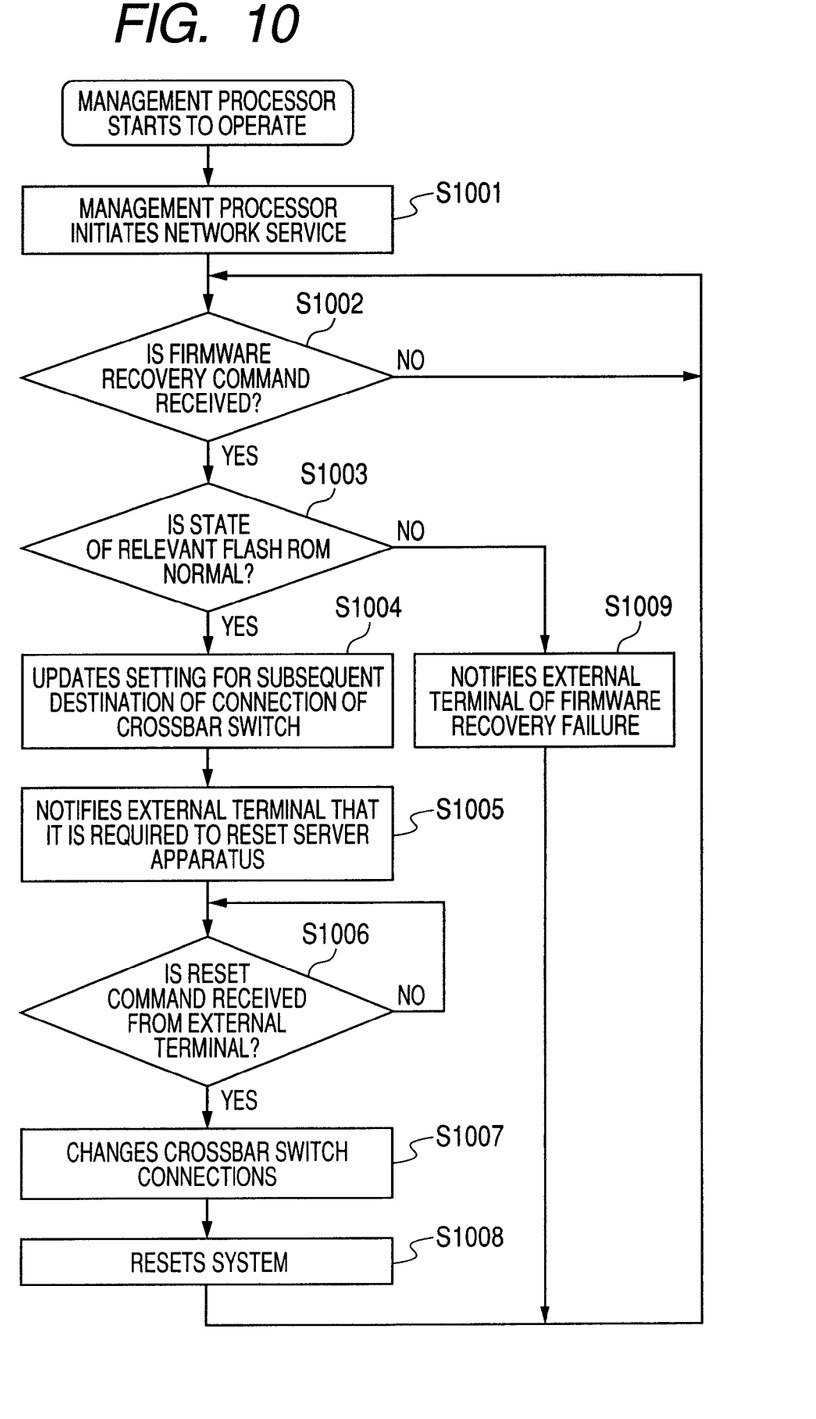
FIG. 10 is a flowchart describing firmware recovery processing operation in an exemplary embodiment.

Then, firmware recovery processing operation is described with reference to FIG. 10. It is assumed that the crossbar switch 12 is controlled by the management processor 14 and placed in a state that it makes the connections as shown in FIG. 3. The management processor 14 of the server apparatus 1 initiates a network service (for example, Web server) and prepares for recovery in response to a firmware recovery command from the user/external terminal 2 via the network 16 (step S1001). After initiating the network service, the management processor 14 waits for a command to change the crossbar switch connections received from the external terminal 2 (for example, access from a Web browser of the personal computer to a Web browser of the management processor 14) (step S1002).

When a firmware recovery command is received from the external terminal 2, the management processor 14 identifies which flash ROM is connected to the crossbar switch bus 113 as the current destination of connection in the crossbar switch settings information (FIG. 5) stored in the flash ROM 15 and checks the state of the flash ROM 131 as shown in FIG. 6, stored in the flash ROM 15 (step S1003). As a result of the check, if the state of the flash ROM 131 to be changed to the bus connection is "normal", the management processor updates the crossbar switch settings stored in the flash ROM 15, i.e., it updates the subsequent destination of the bus 107 to the flash ROM 131 and the subsequent destination of the crossbar switch bus 113 to the flash ROM 132, and stores the updated contents into the flash ROM 15 (step S1004).

The management processor 14 notifies the user of successful firmware recovery and notifies the external terminal 2 of the previous firmware version stored in the flash ROM 131 as shown in FIG. 6. At the same time, it notifies the external terminal 2 that a reboot is required to activate the updated firmware (step S1005). The management processor 14 waits for a reset command received from the external terminal 2 (step S1006). When having received a reset command from the external terminal 2, the management processor 14 controls the crossbar switch control bus 114, according to the settings of subsequent destinations of connections in the crossbar switch settings information stored in the flash ROM 15. According to the settings of the destinations of bus connections, the crossbar switch connects the bus 107 to the flash ROM 131 and connects the crossbar switch bus 113 to the flash ROM 132, as shown in FIG. 2. Then, the management processor copies the settings of subsequent destinations of connections in the crossbar switch settings information to the fields of current destinations of connections and stores the updated information into the flash ROM 15 (step S1007). After the crossbar switch 12 is set accordingly, the management processor 14 transmits a reset signal to the chip set 103 to reboot the server apparatus 1, thus booting or rebooting the server apparatus 1 (step S1008).

As described above, according to the present embodiment, it is possible to update the firmware from a remote site by commanding the management processor to update the firmware from an external terminal via network. By writing firmware update data into a nonvolatile memory not affected by system operation, the management processor can perform firmware update safely, independently of the state of the main power supply and the operating status of the information processing apparatus. After writing the firmware data into the nonvolatile memory, the management processor performs a consistency check (verify). If the result of firmware data write is correct, it changes the connections of the nonvolatile memories through control of the crossbar switch. Thus, even if one nonvolatile memory malfunctions, the operation of the information processing apparatus is allowed to continue by using the previous firmware stored in the other nonvolatile memory.

When rebooting the apparatus after updating the firmware, the firmware can obtain previous setup information from the management processor and restore system settings automatically. Users no longer have to do system settings for the information processing apparatus manually; on the other hand, users of conventional firmware have to do so. Connections of the crossbar switch can be changed by a user command to the management processor from an external terminal via network. Thus, even if there is a fault in the updated firmware, by changing the connection to another nonvolatile memory in which the pervious firmware is stored, it is possible to boot the server apparatus and allow the apparatus to continue its processing operation.

What is claimed is:

1. An information processing apparatus capable of updating system settings information by executing firmware, the information processing apparatus comprising:
a first processor to execute firmware and instructions for data processing;
a second processor connected to the first processor via a first bus to conduct management of at least firmware updating and system settings;
a first memory and a second memory capable of storing current firmware and updated firmware;
a third memory connected to the second processor to store the system settings information defining information for use in conjunction with firmware and its modification; and
a switch to change connections of the first memory and the second memory under control of the second processor, to connect one of the first and second memories to a second bus connected to the first processor and to connect the other one of the first and second memories to the second processor,
wherein the second processor stores firmware for update into the second memory through control of the switch;
after the updated firmware is stored in the second memory, the second processor connects the second memory to the second bus through control of the switch;
the first processor executes the updated firmware obtained from the second memory via the second bus;
during the execution of the updated firmware by the first processor, the second processor reads the system settings information from the third memory and provides this information to the first processor via the first bus;
the first processor reflects the system settings information in firmware data of the updated firmware stored in the second memory;
the first processor provides the reflected system settings information which is reflected in updated firmware data to the second processor via the first bus; and
the second processor stores the reflected system settings information which is reflected in updated firmware data into the third memory;
wherein the third memory stores switch settings information specifying the first or second memory as current and subsequent destinations of connections of the second bus and the switch; and
the second processor refers to the switch settings information read from the third memory and controls the switch to update the subsequent destination of connection of the switch and change the connection of the first or second memory to the second bus.

2. The information processing apparatus according to claim 1, wherein the second processor is commanded to update the firmware in accordance with a command from an external terminal via a network and executes firmware update processing in response to this command.

3. The information processing apparatus according to claim 1, wherein the first processor executes initialization processing based on the updated firmware data which is reflected by the system settings information and, if no error is detected after the initialization processing, the second processor stores the system settings information which is reflected in the updated firmware data into the third memory.

4. The information processing apparatus according to claim 1,
wherein the third memory stores firmware management information indicating firmware versions existing in the first and second memories, their states, and whether or not settings restoration is required;
the second processor reads the firmware management information from the third memory; and
if the firmware management information indicates that system settings information should be restored, the first processor reflects the system settings information in the updated firmware data of the updated firmware.

5. A system setting method for use in an information processing apparatus capable of updating system settings information by executing firmware and comprising a first processor to execute firmware and instructions for data processing, a second processor connected to the first processor via a first bus to conduct management of at least firmware updating and system settings, a first memory and a second memory capable of storing current firmware and updated firmware, a third memory connected to the second processor to store the system settings information defining information for use in conjunction with firmware and its modification, and a switch to change connections of the first memory and the second memory under control of the second processor, to connect one of the first and second memories to a second bus connected to the first processor and to connect the other one of the first and second memories to the second processor, the system setting method comprising:

a step in which the second processor stores firmware for update into the second memory through control of the switch;
  a step in which, after the updated firmware is stored in the second memory, the second processor connects the second memory to the second bus through control of the switch;
  a step in which the first processor executes the updated firmware obtained from the second memory via the second bus;
  a step in which, during the execution of the firmware by the first processor, the second processor reads the system settings information from the third memory and provides this information to the first processor via the first bus;
  a step in which the first processor reflects the system settings information in firmware data of the updated firmware stored in the second memory;
  a step in which the first processor provides the reflected system settings information which is reflected in updated firmware data to the second processor via the first bus; and
  a step in which the second processor stores the reflected system settings information which is reflected in updated firmware data into the third memory;
  wherein the third memory stores switch settings information specifying the first or second memory as current and subsequent destinations of connections of the second bus and the switch; and
  the second processor refers to the switch settings information read from the third memory and controls the switch to update the subsequent destination of connection of the switch and change the connection of the first or second memory to the second bus.

6. The system setting method according to claim 5, wherein the second processor is commanded to update the firmware in accordance with a command from an external terminal via a network and executes firmware update processing in response to this command.

7. The system setting method according to claim 5, wherein the first processor executes initialization processing based on the updated firmware data which is reflected by the system settings information and, if no error is detected after the initialization processing, the second processor stores the system settings information in which is reflected in the updated firmware data into the third memory.

8. The system setting method according to claim 5,
  wherein the third memory stores firmware management information indicating firmware versions existing in the first and second memories, their states, and whether or not settings restoration is required;
  the second processor reads the firmware management information from the third memory; and
  if the firmware management information indicates that system settings information should be restored, the first processor reflects the system settings information in the updated firmware data of the updated firmware.

* * * * *